Sept. 22, 1931.   O. NEHER   1,824,616
TOOL
Filed Dec. 27, 1928
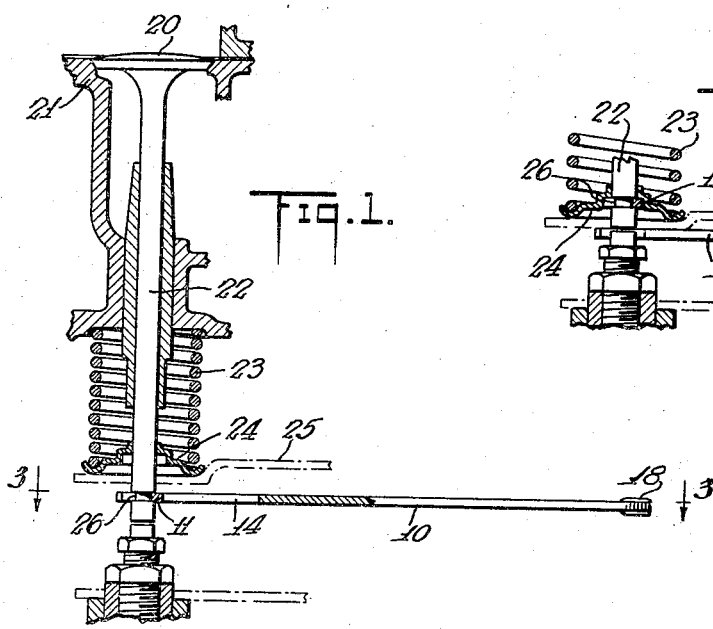
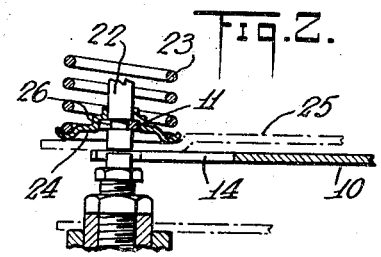
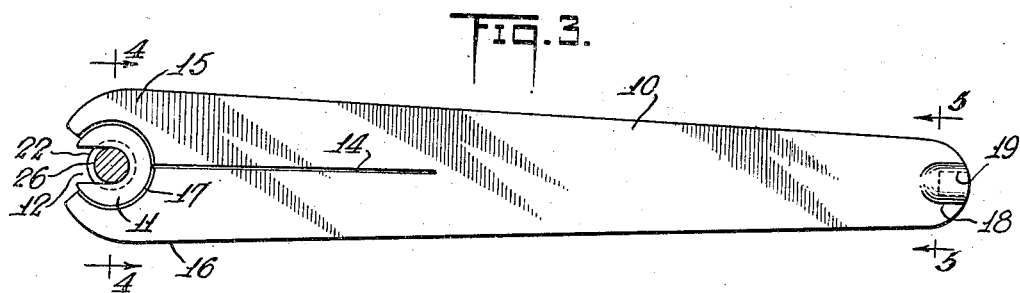
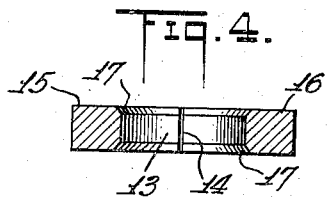
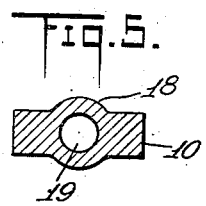
INVENTOR
*Otto Neher*
BY
ATTORNEY Patented Sept. 22, 1931

1,824,616

UNITED STATES PATENT OFFICE

OTTO NEHER, OF NORTH PLAINFIELD, NEW JERSEY

TOOL

Application filed December 27, 1928. Serial No. 328,778.

My invention relates to improvements in tools of the type adapted particularly for the placing of valve-spring stops on the stems of poppet type valves.

In a common valve construction the spring which maintains pressure on a valve bears upon a cup or collar on the valve stem and this collar in turn bears against a stop which may be either a pin inserted in a transverse hole in the stem or a washer of horseshoe or U-shape fitted into an annular seat in the valve stem. To place or withdraw the washer or other stop, is an awkward task because the device is usually located in a cramped and confined space where there is little room for the operator to use his fingers and hence washers or pins are frequently dropped and lost. To gain access to the stop or to the seat therefor in the stem, the collar must be lifted against the pressure of the spring, and not infrequently the spring slips off the lifting tool, injuring the operator's fingers.

It is an object of my invention to provide a tool with which such valve-spring stop devices may be readily applied and removed.

Another object of my invention is to provide a tool particularly adapted for holding washers of horse-shoe type the tool being of such form that after the washer is placed in its seat, the valve spring, on being released, will cause disengagement of the tool from the washer.

Another object of my invention is to provide a tool which may be used not only for applying washers to valve stems but also for inserting pins in valve stems.

Another object of my invention is to provide a tool having a pair of resiliently connected jaws between which a washer may be inserted flatwise, from either face of the tool.

These and other objects are attained in the embodiment of my invention which will now be described in connection with the accompanying drawings, and the novelty and scope of my invention will thereafter be pointed out in the claims.

In the accompanying drawings:

Figure 1 is a side view of my improved tool, partly broken away and illustrating the method of using it to seat a washer on the valve stem, a mounting for the valve and associated parts being also shown in vertical section;

Fig. 2 is a similar and fragmentary view showing the position of the parts after the washer has been seated and the tool has been pushed down clear of the washer by the valve spring;

Fig. 3 is a view in section taken on the line 3—3 of Fig. 1 and showing a plan view of the tool;

Fig. 4 is an enlarged view of the tool in transverse section taken on the line 4—4 of Fig. 3; and Fig. 5 is an enlarged view in section taken on the line 5—5 of Fig. 3.

My improved tool is adapted to hold a washer at one end and a pin at the other so that it may be used for either type of collar holding device. The tool comprises a light bar of metal 10 of approximately the same thickness as the washer it is to handle. The bar preferably tapers from a larger width at the washer-holding end to a smaller width at the pin-holding end.

The washers which this particular type of tool is adapted to handle are of the so-called "horseshoe" type, as best shown at 11 in Fig. 3. The washer consists of a metal disk with a central aperture, and a slot 12, of a width equal to the diameter of the aperture, cut through the wall of the disk.

The larger end of the tool has an arcuate socket 13 formed therein, this socket being of slightly smaller diameter than the washer 11. This socket is open at the outer end of the tool, the opening being preferably greater than that of the slot 12. A narrow slot 14 leads from the socket along the longitudinal axis of the tool, thus virtually forming two jaws 15 and 16 with a part of the socket in each jaw. The tool is made of resilient metal which will permit the jaws to flex sufficiently to admit the washer into the socket and then hold the washer securely therein. The spacing of the jaws at their outer extremities is greater than the diameter of the valve stem on which the washer is to be seated but considerably less than the outside diameter of the washer, so that it will be impossible to introduce the washer into, or remove it from, the socket edgewise through the end of the tool. The washer can only be inserted therein flatwise or in the direction of its axis. To facilitate such insertion the upper and lower corners of the socket wall are rounded or beveled, as shown at 17 in Figs. 3 and 4, so that by laying the washer on either of these beveled corners and lightly pressing the washer against the tool the jaws will be spread open sufficiently to admit the washer into the socket. It will be observed that the washer may be inserted from either side of the tool and may also be removed from the jaws by pushing it out transversely in either direction.

At its opposite end the tool is upset to form a boss 18, and a hole 19 is bored into the end of the boss. The diameter of the hole is such that the pin that is to be held thereby will slide freely therein while the depth of the hole is sufficient to receive only such portion of the pin as is to project from the valve pin when it is seated in the valve stem.

The operation of the tool will be understood by referring to Figs. 1 and 2. Fig. 1 shows a poppet valve 20 seated in a casing 21. The valve stem 22 slides in a suitable bearing in the casing. A valve spring 23 bears at one end against a casing and at the other against a collar 24 slidable on the stem. The drawings show the collar 24 raised above its normal position by a lifter 25 (the latter being indicated in broken lines) so as to provide access to an annular groove 26 formed in a valve stem. A washer 11 gripped between the jaws 15 and 16 has been seated in the groove 26, straddling the body of the stem. When the collar 24 is released it drops under pressure of the valve spring 23, until it is checked by the washer 11 which is retained in the groove 26. In the meantime either the collar 24 or the lifter 25 will strike the tool 10 and push it down clear of the washer, as shown in Fig. 2, so that it may be freely withdrawn.

If desired the tool may also be used to withdraw a washer from the valve stem. In this case, the collar is raised clear of the washer and the tool is then placed on the washer and pressed downward so that the washer will slip into the socket 14 after which the washer may be readily withdrawn from the slot 26.

In the case of a valve construction in which the collar is secured to the stem by a pin, the latter is held in the hole 19 and then, with the collar lifted clear of the pin hole in the stem, the pin may be readily inserted into said pin hole. Since the pin fits snugly into the hole of the stem and loosely into the hole 19, by bearing down slightly on the tool after the pin has been inserted, the pin will be caused to bind in the hole in the stem and hence will draw out of the hole 19 as the tool is withdrawn from the stem. I have explained above that the depth of the hole 19 is equal to the length of pin which is to be left projecting from the valve stem; hence, in operation, the pin is pushed into the hole in the stem, until the end of the tool bears against the stem, and the tool thus serves as a gage to determine the extent to which the pin is to be inserted in the stem.

As washers and pins vary in different makes of cars a separate tool will have to be used for each size of washer or pin. However, the tool may be constructed so cheaply that anyone can afford to supply himself with a number of them to fit all sizes. If desired the tool instead of having a pin socket at one end could be made like the opposite end with a pair of jaws to grip a washer of smaller size. Obviously, too, the socket 13 could be made of different form from that illustrated, to fit washers of different shape.

While I have described a preferred embodiment of my invention, I wish it to be understood that such embodiment is to be taken as illustrative and not limitative of my invention and that various changes in form, structure and arrangement of parts may be made without departing from the spirit and scope of my invention as pointed out in the following claims.

I claim:

1. A washer holding tool comprising a pair of jaws formed with a socket therebetween, the socket having a normal diameter slightly smaller than the outside diameter of the washer that is to be held, and the jaws being adapted to spring apart sufficiently to admit the washer flatwise into the socket from either side of the tool but not from the end of the tool.

2. A tool for holding a washer, said tool comprising a pair of resiliently connected jaws shaped to form a socket therebetween, the socket having a normal diameter slightly smaller than the outside diameter of the washer and a marginal edge of the socket being beveled to permit of forcing the washer flatwise therein, the jaws and their connection being of such stiffness as to prevent the washer from being withdrawn edgewise from the end of the tool.

3. A tool for holding a washer, said tool comprising a pair of resiliently connected jaws shaped to form a socket therebetween, the socket having a normal diameter slightly smaller than the outside diameter of the washer and the marginal edges of the socket being beveled to permit of forcing the washer flatwise into the socket from either side of the tool, the jaws and their connection being of such stiffness as to prevent the washer from being withdrawn edgewise from the end of the tool.

4. A tool for handling valve stem washers, said tool comprising a flat strip of metal longitudinally slit for a portion of its length to form a pair of flat jaws, the jaws being shaped to form a socket between adjacent edges thereof and a throat leading from the socket out between the outer extremities of the jaws, the socket having a normal diameter slightly smaller than the outside diameter of the washer, and the throat being of sufficient width to span the valve stem on which the washer is to be applied but not of sufficient width to span the outside diameter of the washer.

5. A tool for handling valve stem washers, said tool comprising a flat strip of metal longitudinally slit at one end to form a pair of jaws, the jaws being shaped to form a socket therebetween and a throat leading out from the socket between the outer extremities of the jaws, the socket having a normal diameter slightly smaller than the outside diameter of the washer, the marginal edge of the socket being beveled to permit of forcing the washer flatwise therein, the throat being wide enough to span the valve stem on which the washer is to be applied but being of considerably less width than the outside diameter of the washer.

In testimony whereof, I have signed this specification.

OTTO NEHER.